United States Patent [19]

Terada et al.

[11] Patent Number: 5,180,699
[45] Date of Patent: Jan. 19, 1993

[54] PROCESS FOR PRODUCING POWDER MATERIAL FOR LEAD PEROVSKITE CERAMIC

[75] Inventors: Yasuhiko Terada, Ashiya; Kazunobu Abe, Izumi; Hajime Uno, Sakai; Shinichi Shirasaki, Tsukuba, all of Japan

[73] Assignees: Sakai Chemical Industry Co., Ltd., Osaka; National Institute for Research in Inorganic Materials, Ibaragi, both of Japan

[21] Appl. No.: 611,266

[22] Filed: Nov. 13, 1990

[30] Foreign Application Priority Data

Nov. 13, 1989 [JP] Japan ................... 1-294183

[51] Int. Cl.$^5$ .............. C04B 35/46; C04B 35/49; C04B 35/00; C01G 53/00
[52] U.S. Cl. .................. 501/134; 501/135; 252/62.9; 423/594; 423/635; 423/636
[58] Field of Search .......... 501/134, 135, 136; 423/593, 594, 596, 635; 252/62.9

[56] References Cited

U.S. PATENT DOCUMENTS

| | | | |
|---|---|---|---|
| 4,791,078 | 12/1988 | Saito et al. | 501/136 |
| 4,818,736 | 4/1989 | Yamashita et al. | 501/136 |
| 4,853,199 | 8/1989 | Inoue et al. | 423/594 |
| 4,874,598 | 10/1989 | Oda et al. | 423/598 |
| 4,957,888 | 9/1990 | Brand et al. | 501/134 |
| 4,959,333 | 9/1990 | Mori et al. | 501/136 |
| 5,030,604 | 7/1991 | Chen et al. | 501/135 |

FOREIGN PATENT DOCUMENTS 0134399  10/1979  Japan ..................... 501/135

Primary Examiner—Mark L. Bell
Assistant Examiner—Michael A. Marcheschi
Attorney, Agent, or Firm—Wegner, Cantor, Mueller & Player

[57] ABSTRACT

A process for producing a powder material for niobium-containing lead perovskite ceramics represented by the general formula:

$$PbA_xNb_{1-x}O_3,$$

wherein $X=\frac{1}{2}$ or $\frac{1}{3}$, A represents at least one element selected from the group consisting of Fe, Co, Cr, Ni, Mn, Mg, Zn, Cd, Zr, In, Cu and Hf. A dried mixture of a sol or a suspension of a hydroxide a component A which has a lower activity than Pb and a niobic acid sol is first calcinated. A Pb compound is then added with the mixture and the resultant mixture is calcinated again.

5 Claims, No Drawings

PROCESS FOR PRODUCING POWDER MATERIAL FOR LEAD PEROVSKITE CERAMIC

BACKGROUND OF THE INVENTION

1. Field of the Invention

The present invention relates to a process for producing a powder material of lead perovskite ceramics and, more particularly, to a process for producing a powder material for niobium-containing lead perovskite ceramics which has a uniform and very small particle diameter and a high bulk density, which is easy to sinter, and which is capable of producing functional ceramics suitable for use as a piezoelectric element, semiconductor, sensor, optoelectronics material, dielectric, in particular, dielectric of a multilayer capacitor, and the like.

2. Description of the Prior Art

Lead perovskite ceramics are a new material which is not only widely used as a piezoelectric element but also whose use as a dielectric of a multilayer capacitor or the like has been extensively investigated in recent years.

It is for the following reasons that such new uses for lead perovskite ceramics have been investigated:

(1) Since lead perovskite ceramics have a high dielectric constant and a larger dielectric capacity per unit volume than a conventionally used dielectric, it is possible to reduce the size and increase the capacity of a capacitor.

(2) The sintering temperature of lead perovskite ceramics, which is not higher than 1,200° C., is lower than the sintering temperature of barium titanate conventionally used, which is 1,300° to 1,400° C. Thus it is possible to use silver, which is cheaper than platinum or palladium conventionally used and has a comparatively lower melting point, as an internal electrode material.

(3) Since many kinds of materials can constitute a perovskite phase with lead, it is possible to produce many kinds of dielectric materials which correspond to various uses by appropriately changing the composition.

As a process for producing a powder material for such lead perovskite ceramics, a dry process and a wet process are conventionally known.

The dry process is a method of producing lead perovskite ceramics by mixing the oxide powders of the components which constitute a perovskite phase in accordance with the composition and calcining the mixture.

In contrast, the wet process conventionally adopted is a method of producing lead perovskite ceramics by preparing a mixed solution of all the components which constitute a perovskite, adding a precipitate-forming liquid such as an alkali to the mixed solution for effecting coprecipitation, and separating out, drying and calcining the precipitate obtained.

By the above-described dry process, however, it is difficult to obtain a powder material having a uniform composition, and the powder material obtained contains many pyrochlore phases whose dielectric constant is disadvantageously low. In order to reduce the pyrochlore phase and increase the perovskite phase which exhibits ferroelectricity, it is necessary to raise the calcination temperature. When the calcination temperature is high, however, the powder material becomes coarse, leading to a new problem in that it is difficult to obtain a powder material easy to sinter.

In contrast, it is comparatively easy to obtain a powder having a uniform composition by the above-described wet process. However, since it has a uniform composition, the particles are apt to coagulate to form secondary particles during the formation of precipitate, drying or calcination. The particle diameter therefore becomes large, so that it is difficult to obtain a powder material easy to sinter in the same was as in the case of raising the calcining temperature in the dry process.

In addition, in the wet process utilizing coprecipitation, since a precipitate-forming liquid in common with each component, namely, having the same concentration is used, when the precipitate-forming abilities of the components are different from each other, it is difficult to obtain a perovskite having a desired composition.

Furthermore, since the grain size of a ceramic obtained by sintering a powder material by a conventional dry or wet process is generally not less than 5 $\mu$m, such a ceramic is not adaptable to an element which is required to be reduced in size and increased in capacity such as a multilayer capacitor which is often restricted in the thickness of a dielectric layer.

As a result of studies on niobium-containing lead perovskite ceramics undertaken by the present inventors, the following facts have been found.

As a powder material for functional ceramics, a powder having a uniform composition is preferable.

However, from a wrong judgement that a uniform composition is obtained by uniformly mixing the respective compounds of all components, efforts have been made in the prior art to uniformly mix all the components of a perovskite in order to obtain a powder material having a uniform composition without considering the difference in the behavior in a solid phase reaction between components.

However, lead is very reactive and has a very high activity with niobium in comparison with a metal element such as cobalt and nickel. Therefore, if all the components are uniformly mixed as in the prior art in a solid phase reaction which is carried out at a comparatively low temperature in order to prevent the powder material from becoming coarse, the reaction between lead and niobium takes precedence over the reaction between lead and other metals.

This is the reason why the production of the perovskite phases which exhibits ferroelectricity is insufficient in the prior art while many pyrochlore phases, which are a compound of lead and niobium, are produced.

As a countermeasure, a method of preventing the generation of a pyrochlore phase by calcining a mixture of an oxide of A and an oxide of Nb at a temperature of 900° to 1,000° C. to prepare a niobiate and reacting PbO with the niobiate is proposed (Mat. Res. Bull. Vol. 17, 1245 to 1250, 1982, S. L. Swarts and T. R. Shrout).

By this method, however, although pyrochlore phases are greatly reduced, since the temperature for preparing the niobiate of A is high, pulverization is difficult, and it is difficult to obtain fine perovskite having a particle size of not more than 0.5 $\mu$m.

SUMMARY OF THE INVENTION

Accordingly, it is an object of the present invention to eliminate the above-described problems in the prior art and to provide a process for producing a powder material for niobium-containing lead perovskite ceramics which has a high perovskite yield, a desired composition and a high bulk density and which is easy to sinter.

To achieve this aim, a process for producing a powder material for niobium-containing lead perovskite ceramics according to the present invention is characterized by a two-stage calcining process in which a mixture of a component A which has a lower activity than Pb and a niobic acid sol is first calcined, and then the mixture with a lead compound (hereinunder referred to as "Pb compound") added thereto is further calcined.

That is, the present invention provides a process for producing a powder material for niobium-containing lead perovskite ceramics represented by the general formula:

$$PbA_xNb_{1-x}O_3,$$

wherein $X = \frac{1}{2}$ or $\frac{1}{3}$, and A represents at least one element selected from the group consisting of Fe, Co, Cr, Ni, Mn, Mg, Zn, Cd, Zr, In, Cu and Hf, the process comprising the steps of calcining a dried mixture of a sol or a suspension of a hydroxide of a component A which has a lower activity than Pb and a niobic acid sol (this step will be referred to as "calcination B" hereinunder), adding a Pb compound to the mixture and calcining the resultant mixture (this step will be referred to as "calcination P" hereinunder).

DESCRIPTION OF THE PREFERRED EMBODIMENTS

As the niobic acid sol, for example, a sol obtained by holding an aqueous solution of a niobium peroxide complex at 10° to 50° C. for an appropriate time (ordinarily, about 48 hours). The niobium peroxide complex can be produced by reacting a strong acid suspension of niobium hydroxide and hydrogen peroxide. It is preferable to use a deionized sol obtained by the ultrafiltration of impure cations or impure anions such as $Cl^-$ and $NO_3^-$, which are a factor impairing the functional property of ceramics, after the adjustment of the pH of the niobic acid sol with an alkali.

As the component A are usable a suspension or an aqueous solution of an oxide or a hydroxide of A, a sol of A obtained by adding pure water to an alkoxide of A, and an aqueous solution of an alcoholic solution of a compound of A which is anion exchanged to obtain hydroxide ions by bringing the solution into contact with an anion exchange resin.

The Pb compound is not restricted in the present invention, but a Pb compound whose components other than lead evaporate during calcination is preferred. Examples thereof are lead carbonate, lead hydroxide, lead nitride, lead oxide, lead acetate, lead oxalate and lead formate. It is also possible to use these Pb compounds in the form of a mixture.

A process for producing a powder material for lead perovskite ceramics according to the present invention will be explained hereinunder.

The process of the present invention includes the steps of calcination B of a dried mixture of a niobic acid sol and the component A compound, wet mixing of the mixture subjected to the B calcination and a Pb compound, and calcination P, as the main effective steps.

In the process of the present invention, a dried mixture of a niobic acid sol and the component A is first subjected to calcination B. It is preferable to use a mixture of a sol of a hydroxide of the component A, particularly, a compound of A which is ion exchanged by bringing the compound of A into contact with a strong basic anion exchange resin, and a niobic acid sol. This is because this mixture is composed of a group of uniform fine particles having a large surface energy. By virtue of the large surface energy, it is possible to carry out the subsequent steps of calcinations B and P at a lower temperature than in the prior art.

Both the steps of calcinations B and P are preferably carried out at a temperature of 400° to 900° C. If the temperature is lower than 400° C., the reaction is insufficient, while in the case of exceeding 900° C., the particle diameter of the powder material becomes so large it is difficult to obtain a powder which is easy to sinter.

A method of mixing the product obtained by calcination B and Pb compound is not specified but wet pulverization mixing is generally preferred from the point of view of the uniformity of the mixture.

The purpose of adopting a two-stage calcination process in the present invention is to suppress the generation of pyrochlore phases caused by the precedence of a reaction between lead and niobium and to enable a powder material having a high perovskite yield to be obtained at a low calcination temperature. In order to further lower the reaction temperature at the step of calcination B, a niobic acid sol is used as a niobium material.

As described above, according to the present invention, since the perovskite yield is enhanced by adopting a two-stage calcination process and using a niobic acid sol, it is unnecessary to raise the calcination temperature to enhance the yield unlike in the prior art, and calcination at a comparatively low temperature is enabled. The calcination at a low temperature, in turn, enables the production of a powder material having a very small particle diameter which is easy to sinter.

In addition, it is possible to obtain a powder material having a large specific surface area by lowering the calcination temperature, and sintering at a low temperature is also enabled due to the reduction in diameter of the powder material.

Accordingly, in the case of applying a powder material obtained by the process of the present invention to a dielectric of a capacitor, it is possible to use not only platinum and palladium conventionally used, and silver, which is cheaper than these metals but also base metals, which are even cheaper than silver, as the inner electrode. In this way, the range of electrode materials is enlarged and reduction in cost is also enabled. Especially, since a powder material obtained by the process of the present invention is a ferroelectric material having a large specific surface area and a high bulk density, it is effective for, for example, a multilayer capacitor, which is required to be reduced in size and increased in capacity.

In the case of applying a powder material obtained by the process of the present invention to a dielectric material, it is practical to use the powder material obtained by the process of the present invention and another Pb perovskite ceramic powder material mixed therewith in the form of a solid solution.

As examples of another Pb perovskite ceramic powder material, those represented by the following general formula will be cited:

$$PbA_xNB_{1-x}O_3,$$

wherein A represents the same as defined above, and B represents at least one element selected from the group consisting of W, Nb and Ta In order to form the solid solution, another Pb perovskite ceramic powder material may be mixed with the mixture in the present invention prior to calcination B or calcination P.

In order to control the sintering property of the powder material or the electric characteristics of the ceramic obtained, a slight amount the of compounds $MnO_2$, $SiO_2$, $Bi_2O_3$ or the like may be added by a dry or a wet process.

The present invention will be explained in more detail with reference to the following examples but it will be understood that the present invention is not restricted thereto and various modifications may be made thereto within the true spirit and scope of the invention.

EXAMPLE 1

0.2 mol of niobium hydroxide (produced by Mitsui Mining & Smelting Co., Ltd.) was dispersed in 300 ml of pure water, and after adding 1 mol of concentrated hydrochloric acid thereto, 0.8 mol of hydrogen peroxide was gradually added under stirring. Thereafter, by adding pure water to the mixture to convert niobium hydroxide into a niobium peroxide complex and 1 l of an aqueous solution of a complex of niobium peroxide was prepared. The aqueous solution was held at 45° C. for 48 hours to produce a peroxoniobic acid sol.

6-N ammonia water was then added dropwise to the peroxoniobic acid produced to adjust the pH to 1.5 so as to enable ultrafiltration. The particle diameter of the colloidal particles of the sol was 0.02 μm (measured by laser particle-size analysis system LPA-3000/3100, produced by Otuska Denshi).

The peroxoniobic acid sol was passed through an ultrafilter (polysulfone, differential molecular weight 10000) to remove impurity ions such as chlorine ions for purification.

Separately from this, 500 ml of a strong basic anion exchange resin (ion exchange capacity: 1.04 eq/R-1, produced by Sumitomo Chemical Co., Ltd., trade name: Duolite A-101D) was added to 500 ml of an aqueous solution of 0.2 mol of magnesium nitrate, and the mixture was gently stirred for 30 minutes to separate the anion exchange resin from the magnesium hydroxide sol.

The peroxoniobic acid sol and the magnesium hydroxide sol obtained above were mixed under stirring, dried by a spray drying method, and heated for 2 hours at 650° C. in an alumina crucible for calcination B.

The average particle diameter of the powder obtained by calcination B was 0.08 μm (measured by laser particle-size analysis system LPA-3000/3100, produced by Otuska Denshi). From the X-ray analysis, the powder was proved to be the crystals of $MgNb_2O_6$.

Lead oxide was mixed with the powder obtained by calcination B so as to have a composition of $Pb(Mg_{\frac{1}{3}}Nb_{\frac{2}{3}})O_3$, and the mixture together with pure water was charged into a polyamide pot containing zirconia balls (5 mm in diameter). The pot was placed in a ball mill to mix the mixture for 15 hours by a wet process, and after the zirconia balls were taken out, the content was dried. The dried powder obtained was subjected to calcination P in an alumina crucible at 700° C. for 2 hours to obtain a powder material for ceramics having a composition of $Pb(Mg_{0.33}Nb_{0.66})O_3$.

The perovskite ratio of the powder obtained by calcination P was calculated by X-ray analysis. The result is shown in the table.

The powder obtained by calcination P was pulverized in a ball mill for 15 hours by a wet process, and after drying the pulverized powder, 8 wt % of an aqueous solution of polyvinyl alcohol was added to the powder for granulation. The granules were molded under a pressure of 1000 kg/cm² to obtain a green molded product in the form of pellets.

The green molded product was placed in an electric oven and heated at 500° C. for 4 hours to thermally decompose the polyvinyl alcohol. Thereafter, the temperature was raised and the green molded product was fired at 950° C. for 2 hours to obtain sintered pellets.

The perovskite ratio of the pellets obtained was calculated by X-ray analysis. The result is shown in the table. Calcination B and calcination P were carried out for 2 hours at the respectively predetermined temperatures shown in the table.

EXAMPLE 2

After an aqueous solution obtained by dissolving 0.2 mol of magnesium nitrate (produced by Wako Pure Chemical Industries Ltd.) in 500 ml of pure water was added in 30 minutes to an aqueous solution obtained by dissolving 0.6 mol of ammonium bicarbonate (produced by Wako Pure Chemical Industries Ltd.) in 500 ml of pure water, the mixture was stirred for 30 minutes. The purified peroxoniobic acid sol obtained in Example 1 was mixed with the magnesium hydroxide obtained so as to have a composition of $MgNb_2O_6$ and dried by a spray drying method. The powder was subjected to two-stage calcination and sintering in the same way as in Example 1 to obtain sintered pellets. The perovskite ratios of the powder and the pellets obtained were calculated by X-ray analysis. The results are shown in the table. Calcination B and calcination P were carried out for 2 hours at the respectively predetermined temperatures shown in the table.

EXAMPLES 3 TO 5

The powders and sintered pellets were subsequently obtained by carrying out two-stage calcination and sintering in the same way as in Example 2 except for using ferric nitrate (Example 3), cobalt nitrate (Example 4) and nickel nitrate (Example 5), respectively, in place of magnesium nitrate. The perovskite ratios of the powders and pellets obtained were calculated by X-ray analysis. The results are shown in the table. Calcination B and calcination P were carried out for 2 hours at the respectively predetermined temperatures shown in the table.

COMPARATIVE EXAMPLE 1

Powders of magnesium oxide (produced by Ube Chemical Industries Co., Ltd.) and niobium oxide (produced by Mitsui Mining & Smelting Co., Ltd.) were mixed so as to have a composition of $MgNb_2O_6$. The mixture together with pure water was charged into a polyamide pot containing zirconia balls (5 mm in diameter). The pot was placed in a ball mill to mix the mixture for 15 hours by a wet process, and after the zirconia balls were taken out, the content was dried and subjected to calcination B. Lead oxide (produced by Dai-Nippon Toryo Co., Ltd.) was mixed with the powder obtained by calcination B so as to have a composition of $Pb(Mg_{\frac{1}{3}}Nb_{\frac{2}{3}})O_3$, and the mixture was subjected to two-stage calcination and sintering in the same way as in Example 1 to subsequently obtain a powder and sintered pellets. The perovskite ratios of the powder and the pellets obtained were calculated by X-ray analysis. The results are shown in the table. Calcination B and calcination P were carried out for 2 hours at the respectively predetermined temperatures shown in the table.

COMPARATIVE EXAMPLES 2 TO 4

The powders and sintered pellets were subsequently obtained by carrying out two-stage calcination and sintering in the same way as in Comparative Example 1 except for using ferric oxide (produced by Rare Metal) (Comparative Example 2), cobalt oxide (produced by Wako Pure Chemical Industries Ltd.) (Comparative Example 3) and nickel oxide (produced by Kishida Kagaku) (Comparative Example 4), respectively, in place of magnesium oxide. The perovskite ratios of the powders and pellets obtained were calculated by X-ray analysis. The results are shown in the table. Calcination B and calcination P were carried out for 2 hours at the respectively predetermined temperatures shown in the table.

TABLE

| | B-Calcining Temp. × Time (°C.) (hr) | Specific Surface Area of Niobate (B-Calcined Powder) (m²/g) | P-Calcining Temp. × Time (°C.) (hr) | Specific Surface Area of P-Calcined Powder (m²/g) | Perovskite Ratio*) (%) | Sintering Temp. × Time (°C.) (hr) | Perovskite Ratio of Sintered Pellets*) (%) |
|---|---|---|---|---|---|---|---|
| Example 1 | 650 × 2 | 12.9 | 700 × 2 | 3.2 | 100 | 950 × 2 | 100 |
| Example 2 | 700 × 2 | 8.5 | 700 × 2 | 2.7 | 100 | 950 × 2 | 100 |
| Comparative Example 1 | 800 × 2 | 4.0 | 900 × 2 | 1.0 | 90.1 | 1150 × 2 | 96.8 |
| Example 3 | 800 × 2 | 8.6 | 700 × 2 | 2.1 | 100 | 950 × 2 | 100 |
| Comparative Example 2 | 900 × 2 | 2.6 | 800 × 2 | 1.3 | 86.5 | 1000 × 2 | 96.5 |
| Example 4 | 700 × 2 | 9.7 | 800 × 2 | 1.5 | 100 | 950 × 2 | 100 |
| Comparative Example 3 | 800 × 2 | 1.8 | 800 × 2 | 0.5 | 96.1 | 1000 × 2 | 97.2 |
| Example 5 | 800 × 2 | 5.5 | 800 × 2 | 2.0 | 100 | 950 × 2 | 100 |
| Comparative Example 4 | 900 × 2 | 0.7 | 900 × 2 | 0.4 | 90.9 | 1050 × 2 | 97.5 |

*)Perovskite Ratio: [I(perovskite (110))/(I(perovskite (110) + I(pyrochlore (222))] × 100

As shown in the table, the perovskite ratio of each sintered pellet obtained in Examples 1 to 5 was 100%. In contrast, the perovskite ratio of each sintered pellet obtained in Comparative Examples 1 to 4 was less than 100% (96.5 to 97.5%).

From this fact it was confirmed that all the pellets obtained in Examples 1 to 5 were composed of the perovskite phases only, while the pellets obtained in Comparative Examples 1 to 4 were composed of a mixed phase of perovskite phases and pyrochlore phases.

It goes without saying that although a part of the elements constituting the component A are used in these embodiments, similar results are obtained by using other elements.

As described above, according to the process of the present invention, since a compound of the component A which has a low reactivity and a niobic acid sol are mixed in advance, it is possible to calcinate the mixture at a low temperature, thereby obtaining a fine powder having a uniform composition and easy to sinter. By using this powder material, it is possible to produce ceramics having very small grain size. The ceramics having such a composition are applicable not only to a piezoelectric element, semiconductor, sensor, optoelectronic material, a ferroelectric material of a circular capacitor, etc., but also especially to the field in which reduction in size and increase in capacity are required such as a ferroelectric material of a multilayer capacitor.

Thus, the present invention has excellent advantages.

While there has been described what is at present considered to be preferred embodiments of the invention, it will be understood that various modifications may be made thereto, and it is intended that the appended claims cover all such modifications as fall within the true spirit and scope of the invention.

What is claimed is:

1. A process for producing a powder material for lead perovskite ceramics represented by the formula:

$$PbA_xNb_{1-x}O_3$$

wherein x equals $\frac{1}{2}$ or $\frac{1}{3}$ and A represents at least one element selected from the group consisting of Fe, Co, Cr, Ni, Mn, Mg, Zn, Cd, Zr, In, Cu and Hf, said process comprising the steps of calcining a dried mixture of a compound of A and a niobic acid sol at a temperature of about 400°–900° C.; adding a Pb compound to said calcined mixture; and calcining the resultant mixture at a temperature of about 400°–900° C.

2. A process according to claim 1, wherein said niobic acid sol is produced by reacting a strong acid suspension of niobium hydroxide and hydrogen peroxide to form an aqueous solution of niobium peroxide complex, and then holding the solution at a temperature of 10°–50° C. to convert the solution into a sol.

3. A process according to claim 1, wherein the niobic acid sol is produced by reacting a strong acid suspension of niobium hydroxide and hydrogen peroxide to form an aqueous solution of niobium peroxide complex, then holding the solution at a temperature of 10°–50° C. to convert the solution into a sol, and deionizing the sol by ultrafiltration of ionic impurities.

4. A process for producing a powder material for lead perovskite ceramics according to claim 1, wherein said compound of said A is obtained by neutralizing a hydroxide or a salt of said A with an alkali and washing said hydroxide or salt of said A with water.

5. A process for producing a powder material for lead perovskite ceramics according to claim 1, wherein said compound of said A is obtained by anion exchange reaction between an aqueous solution or an alcoholic solution of a salt of said A and an anion exchange resin.

* * * * *